United States Patent [19]

Malhotra et al.

[11] Patent Number: 5,504,887
[45] Date of Patent: Apr. 2, 1996

[54] STORAGE CLUSTERING AND PACKING OF OBJECTS ON THE BASIS OF QUERY WORKLOAD RANKING

[75] Inventors: Ashok Malhotra, Croton-on-Hudson; Kenneth J. Perry, Riverdale, both of N.Y.

[73] Assignee: International Business Machines Corporation, Armonk, N.Y.

[21] Appl. No.: 120,102

[22] Filed: Sep. 10, 1993

[51] Int. Cl.$^6$ ................................................ G06F 17/30
[52] U.S. Cl. ........................ 395/600; 364/DIG. 1; 364/282.1; 364/246; 364/246.3
[58] Field of Search ............................................. 395/600

[56] References Cited

U.S. PATENT DOCUMENTS

| | | | |
|---|---|---|---|
| 4,774,657 | 9/1988 | Anderson et al. | 395/600 |
| 4,935,876 | 6/1990 | Hanatsuka | 395/51 |
| 4,965,743 | 10/1990 | Malin et al. | 395/50 |
| 4,989,132 | 1/1991 | Mellender et al. | 395/700 |
| 5,075,842 | 12/1991 | Lai | 395/425 |
| 5,075,845 | 12/1991 | Lai et al. | 395/425 |
| 5,103,498 | 4/1992 | Lanier et al. | 395/68 |
| 5,157,765 | 10/1992 | Birk et al. | 395/163 |
| 5,181,162 | 1/1993 | Smith et al. | 364/419.19 |
| 5,263,159 | 11/1993 | Mitsui | 395/600 |
| 5,276,867 | 1/1994 | Kenley et al. | 395/600 |
| 5,313,631 | 5/1994 | Kao | 395/600 |
| 5,321,833 | 6/1994 | Chang et al. | 395/600 |
| 5,379,422 | 1/1995 | Antoshenkov | 395/600 |
| 5,404,510 | 4/1995 | Smith et al. | 395/600 |

OTHER PUBLICATIONS

Cornell et al, "An Effective Approach to Vertical Partitioning For Physical Design Of Relational Databases", IEEE Transactions on Software Engineering, vol. 16, No. 2, Feb. 1990, pp. 248–258.

Bhatia et al, "Assignment of Term Descriptors to Clusters", Proc of 1990 Symposium on Applied Computing, 5–6 Apr. 1990, pp. 181–185.

James W. Stamos, "Static Grouping Of Small Objects To Enhance Performance Of A Paged Virtual Memory", ACM Transactions on Computer Systems, vol. 2, No. 2, May 1984 pp. 155–180.

A. Jhingran, M. Stonebraker, "Alternatives In Complex Object Representation: A Performance Perspective" IEEE Comput. Soc, xii+585 pp. 94–102, 1990 (Abstract).

P. Soupas et al., "Extending Object Oriented Databases With Rules In Parbase-90", International Conference on Databases, Parallel Architectures and Their Applications, IEEE Comput. Soc. Press, xiv+570 pp. 556–557, 1990 (Abstract).

J. Richardson, P. Schwarz, "MDM An Object Oriented Data Model", Jul. 1991, RES–San Jose, (Abstract).

B. A. Weston, "Segmenting An Object Oriented Database", Apr. 1987, Res.—Yorktown, (Abstract).

*Primary Examiner*—Thomas G. Black
*Assistant Examiner*—Wayne Amsbury
*Attorney, Agent, or Firm*—Louis J. Percello

[57] ABSTRACT

An apparatus and method is disclosed for efficiently clustering program objects on a unit of storage in a secondary memory, e.g., a page of memory on a disc. The objects are clustered so that a set of queries (query set) can access the stored objects with a minimum number of page transfers from secondary storage to main memory. To determine how the objects are clustered together on each memory page, queries in the query set and the objects that they access are identified. The queries are ranked by a number of factors including the query weight, the memory space required to store objects accessed by a query, and the number of objects a query has in common with other queries. The objects accessed by the query set are clustered on secondary memory pages according to the query ranking. Partially packed memory pages can be combined to minimize the cost of the query set accessing the stored objects.

8 Claims, 6 Drawing Sheets

FIG. 1

FIG. 3 where $I_{i,j} = c_{i,j} \cdot \omega_j$

STORAGE CLUSTERING AND PACKING OF OBJECTS ON THE BASIS OF QUERY WORKLOAD RANKING

FIELD OF THE INVENTION

This invention relates to the field of accessing computer databases. More specifically, the invention relates to clustering data objects on pages in secondary storage to minimize the number of pages accessed by a set of queries that reference the data objects.

BACKGROUND OF THE INVENTION

Efficient transfer of information from one memory device to another is an old problem in the computer arts. The problem arises when there is a need to access information that is stored in some bulk or secondary memory device of the computer, e.g., a disc, and transfer that information to the working or main memory of the computer for processing. Typically, information stored in memory devices of the computer (like bulk or secondary storage) is transferred to main memory in blocks or pages.

Information can be accessed from the system by using one or more queries (query set). If all the information required by a given query is located in one page of memory, the requirements of the query access will be satisfied when that page is retrieved into main memory. However, if the information required by the query is located on more than one page, several pages (or possibly a very large number of pages) may have to be retrieved to satisfy the requirements of the query or query set.

Retrieving more pages, than necessary can cause the computer to operate more slowly and inefficiently because multiple extra pages (perhaps a large number of extra pages) of memory would be accessed to satisfy the query (or query set). Accordingly, system speed and performance can be improved by clustering together, on a page of secondary memory, a set of data objects that are often required by the same query (or query set) so that the number of page accesses required to satisfy the query (or query set) is kept to a minimum.

This problem is encountered in object oriented databases or persistent object systems. Object oriented systems use objects which contain "content" such as basic information-bearing constituents like text, image, voice or graphics. Objects may also contain logical or physical relationships to other objects as well as access restrictions. Each object is also associated with executable code although that is rarely stored along with the object. Because objects in many systems are typically much smaller than the size of a page of memory, the system can select a subset of objects to cluster on a given page in many ways. However, improper object clustering can cause excess page left, fences and the commensurate inefficient operation.

The prior art has recognized the importance of storing related objects together and devised various schemes to implement object clustering. The simplest schemes for object clustering allow the programmer to specify which objects should be placed together. The problem with this approach is that while the programmer may have a good idea of small sets of objects that are likely to be accessed together, the global problem of optimizing object access over a large set of objects and many queries is extremely complex. For these large complex global cases, strategies based on local (referring to a subset of the set of objects and queries) information are likely to be suboptimal, perhaps severely so.

A better approach in the prior art is to use the structure of the object classes to infer access patterns and assign/cluster objects on a page accordingly. Unfortunately, here again, this improved method relies upon local information (object references based on the structure of the class) and does not optimize the global set of objects and queries. These static techniques also suffer from the short-coming that access patterns may change as the database evolves and objects are created, deleted, changed in size, and updated to refer to different objects. Thus, even if one of these schemes is used for an initial set of objects and queries, some dynamic algorithm is required to periodically reorganize the database and ensure that good clustering is maintained.

One dynamic clustering heuristic available in the prior art, known to the inventors, is based on collecting reference counts on all objects over some period of time and then using a "greedy" algorithm to assign objects to pages. It is well known that greedy algorithms are not only non-optimal but yield poor performance in complex situations.

The clustering problem is inherently difficult to solve. Most likely, the cost in terms of computation time of solving the problem, i.e., finding an optimal way to cluster the objects of the pages of secondary memory, increases exponential with the number of objects. This exponential growth has a critical effect, since for each additional object, the cost of solving the problem increases by a multiplicative factor. For example, a problem involving 20 objects is 11 orders of magnitude more expensive than a problem involving 10 objects. More specifically, a clustering problem of twenty objects gives rise to approximately $10^{24}$ ways of assigning objects to pages.

Because the daunting number of possible ways to assign objects to pages for large numbers of objects and queries makes the cost of solving an instance of the clustering problem so expensive, one approach in the prior art is to use Linear or Integer Programming formulations. However, these methods become computationally infeasible for even relatively modest problems because of the large number of variables generated by using Linear Programming or Integer Programming techniques.

OBJECTS OF THE INVENTION

An object of this invention is an improved method of clustering objects on one or more pages of secondary storage memory to minimize the number of pages accessed by a set of queries that are accessing the clustered objects.

Another object of this invention is an improved method and apparatus for minimizing the time needed to process a set of queries when the objects accessed by the queries are stored on pages of a secondary memory storage device.

SUMMARY OF THE INVENTION

This invention is an apparatus and method for efficiently clustering objects on a unit of storage in a secondary memory, e.g., a page of memory on a disc, so that a set of queries can access the stored objects with a minimum number of page transfers from secondary storage to main memory. The objects of a set of queries are clustered together on each page of a plurality of secondary memory pages of a given size.

The method starts by identifying the queries of the query set and the set of objects accessed by the query set. A weight for each query is then determined. The queries in the query set are then ranked. The queries can be ranked by the query weight and/or other factors such as the amount of secondary memory required by the objects accessed by the query and the number of accessed objects that a query has in common with other queries in the query set. The query rank is then used to determine how to cluster objects on pages in secondary memory. In a preferred embodiment, secondary memory pages that are only partially packed with objects are combined to reduce the number of pages that the query set needs to transfer into main memory when accessing the objects.

DETAILED DESCRIPTION OF THE INVENTION

Figure 1:
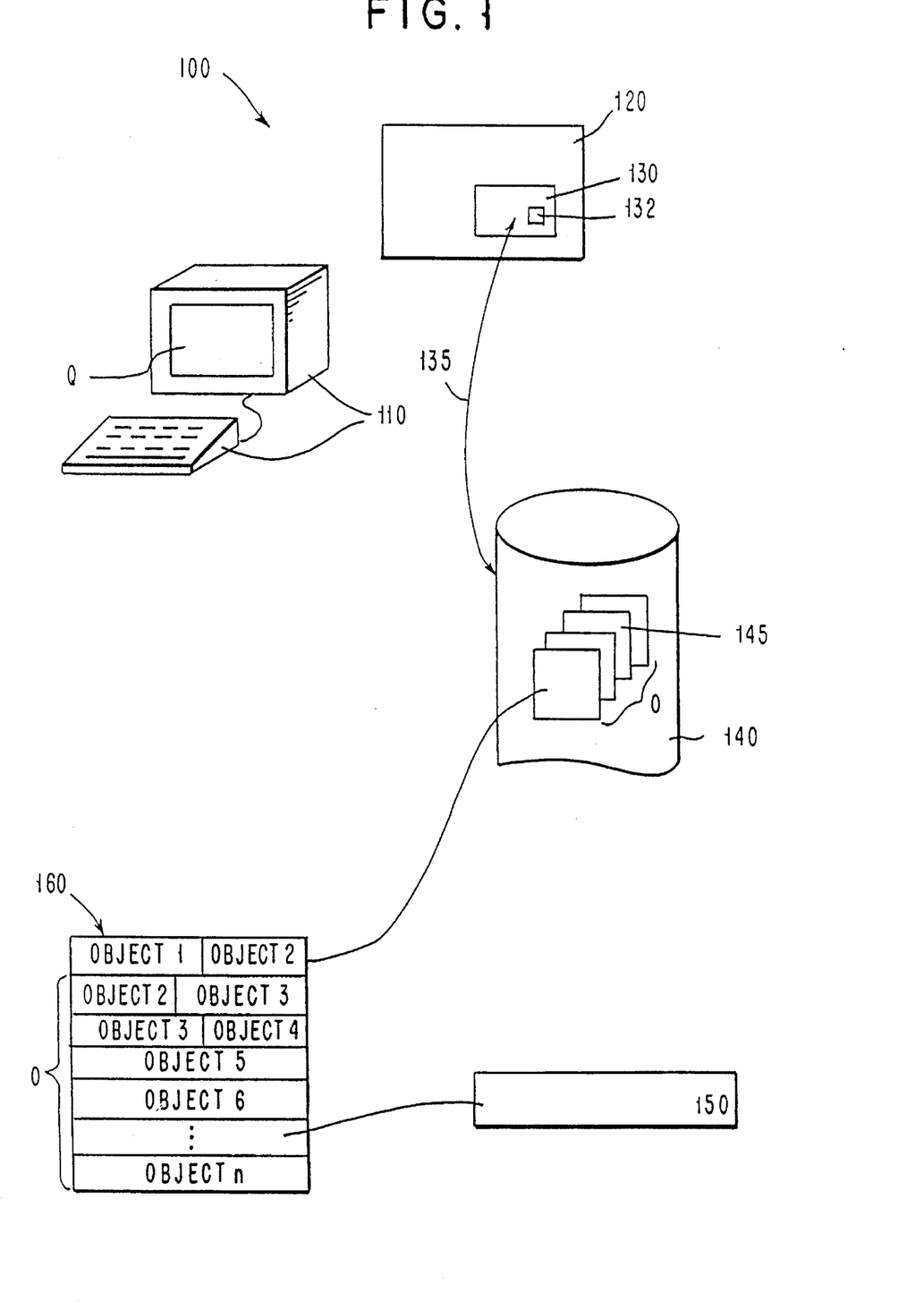
FIG. 1 is a block diagram of a general purpose computer using an object oriented database and the present method for packing objects.

FIG. 1 shows the present invention embodied in a general purpose computer system 100. This system has an interface 110 for receiving requests from a user. Requests may also be received from an application program 132 running on the system 100 or from another computer. A request may contain one or more queries (in a query set) that access objects stored on a secondary storage device 140. The interface 110 can be a common keyboard and computer screen that is provided with the system 100 or other interfaces 110 that could receive requests from sources other than a human user, e.g., another computer. Such interfaces 110 are well known. The system 100 also has a processor 120 with a working or main memory 130 capable of containing a given number of pages. The system secondary storage device 140, in this case a disc memory, stores data in a plurality of memory pages 145. Typically, these pages 145 are units of storage or subdivisions of the secondary memory (disc 140) like disc cylinders or other physical partitions. These partitions (pages 145) are assumed to be of fixed size, e.g. 4096 bytes. The operating system of the computer system 100 swaps or transfers (135) pages of memory between the disc 140 and main memory 130 based on the requirements of the application program 132 being executed on the computer system 100. Object oriented database systems or persistent object systems that run on the system 100, require that objects (which may contain pieces of data or executable code and may vary in length), typically 150, be stored on pages 145 in the disc 140. These objects 150 are clustered or packed 160 on one or more pages 145 of the disc 140 storage according to various process methods described below.

This invention discloses a novel apparatus and method for efficiently clustering 160 objects on secondary storage pages 145 so that the number of pages swapped 135 into main memory 130 is kept to a minimum when the computer system 100 accesses the disc pages 145 in response to the query set, Q, contained in a typical workload of requests.

Figure 2:
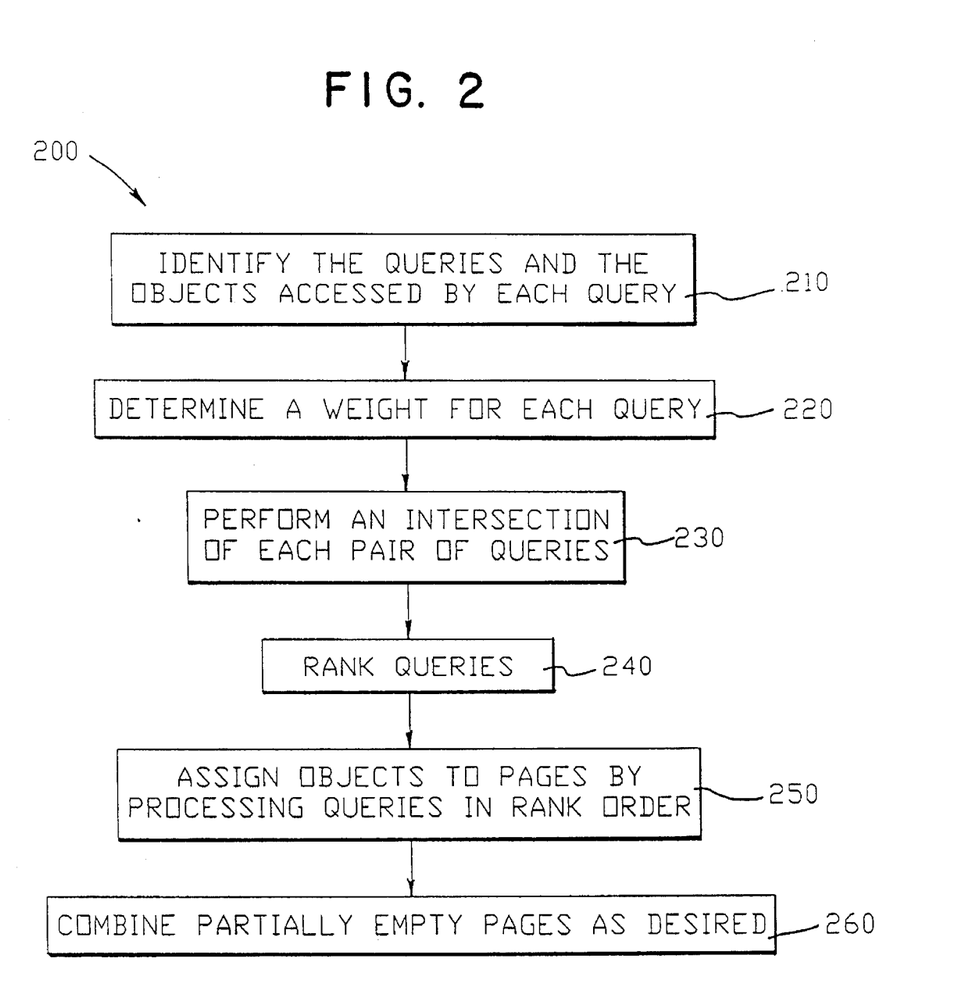
FIG. 2 is a flow chart following the method steps of the present invention.

FIG. 2 is a flow chart showing the method 200 of the present invention. Before the method can be performed, certain information has to be determined 210. This information includes: the queries in the set of queries, Q, or workload, performed by the system 100; the set of objects, O in FIG. 1, that the set of queries will access; a weighting factor for each of the queries in the set of queries, Q; and the page size, S, of a unit of storage on the secondary memory 140. (The page size 145, S, is a fixed number, e.g., 4096 bytes, that is determined and provided by the operating system of the computer system 100.)

The query set, Q, typically is determined by the application programs that are run on the system 100. In the preferred embodiment, the system will run one or more known application programs 132 periodically. Each of these application programs will have one or more queries that will require access to information in the secondary memory 140. For example, an application program may be run each week on a system 100 that queries the database for the number of hours each employee of a company works, how much the respective employee makes per hour, and how much merchandise the employee sold that week. Other application programs 132 may periodically query the database as well. Each of these queries, $q_i$, for all the application programs 132 that are identified to run on the system, called the work load, comprise the query set, Q. Specifically, $$Q=\{q_1, q_2, \ldots, q_m\}$$

where Q is the query set and $q_i$ is a query of the database in the secondary storage 140 that is posed by a given application program 132.

The information that each query, $q_i$, accesses from the secondary memory are objects, o. Each query, $q_i$, of an application program 132 may access one or more objects, o. The query set, Q, accesses a set of objects, O or object set, that comprises the objects that are accessed by all the queries, $q_i$. The object set, O, is defined as:

$$O=\{o_1, o_2, \ldots, o_n\}$$

This set of objects, O, is determined by examining each query, $q_i$, in the query set, Q, to determine which object(s) the given query, $q_i$, needs to access. Note that $O_i$ designates that subset of objects that is accessed by a single query, $q_i$.

An object contains information that is used by an application 132. Objects are divided into types. All objects (or object instances) or a type contain the same type of information although the values stored in each instance would be different. For example, in a very simple case, objects of type "customer" would all store customer name, address and telephone number. Each object instance would store this information for a different customer.

In a preferred embodiment, objects to be accessed by a query are determined by examining the query for requests for records from the database stored in secondary memory 140. A query may access one or more objects. In addition, two or more queries may access the same object(s). For example, a query may access a department object and all its employee objects. Once all the objects accessed by each query, $q_i$, in the query set, Q, are identified, the duplicate objects are deleted. The remaining objects comprise the object set, O.

Refer to box 220 of FIG. 2. Once the query set, Q, has been identified, a weighting factor has to be assigned to each query, $q_i$, in the query set. In the preferred embodiment this weighting factor is related to the frequency with which an individual query, $q_i$, is run. This is determined by the number of times a query appears in an application program(s) 132 and the number of times the application program(s) is (are)run.

In the preferred embodiment, let the query $q_i$ occur $n_{i,a}$ times in application, "a", which is run $r_a$ times during the time period of interest. The weight, $w_i$, of each respective query, $q_i$, is then calculated as follows:

$$w_i = \Sigma r_a n_{i,a}$$

The sum is taken over all the applications, a. Also, the weights can be normalized, if necessary, by dividing by the sum of the weights of all the queries, $q_i$ in the query set, Q:

$$\Sigma w_i.$$

There are other ways to determine query weight. For instance, all the queries can be defined arbitrarily to be of equal weight. Alternatively, query weight can be solely a function of the number of times a query is used in an application program or solely a function of the number of application programs that use the query. Given this disclosure, one skilled in the art could come up with other equivalent weighting methods that are also contemplated by this invention.

Once a weight has been determined for each query 220, an intersection of each pair of queries is performed 230. The intersection 230 is performed on each pair of queries to determine which query pairs contain queries that access common objects and to determine a pair intersection weight, $I_{i,j}$ of each query pair. In a preferred embodiment, each pair intersection weight, $I_{i,j}$, is related to the value of the sum of the query weights of all queries that have objects in common with a given selected query, $q_k$. In this embodiment, queries in the query set that have no objects in common with the selected query, $q_k$, contribute a value of zero to the sum.

Figure 3:
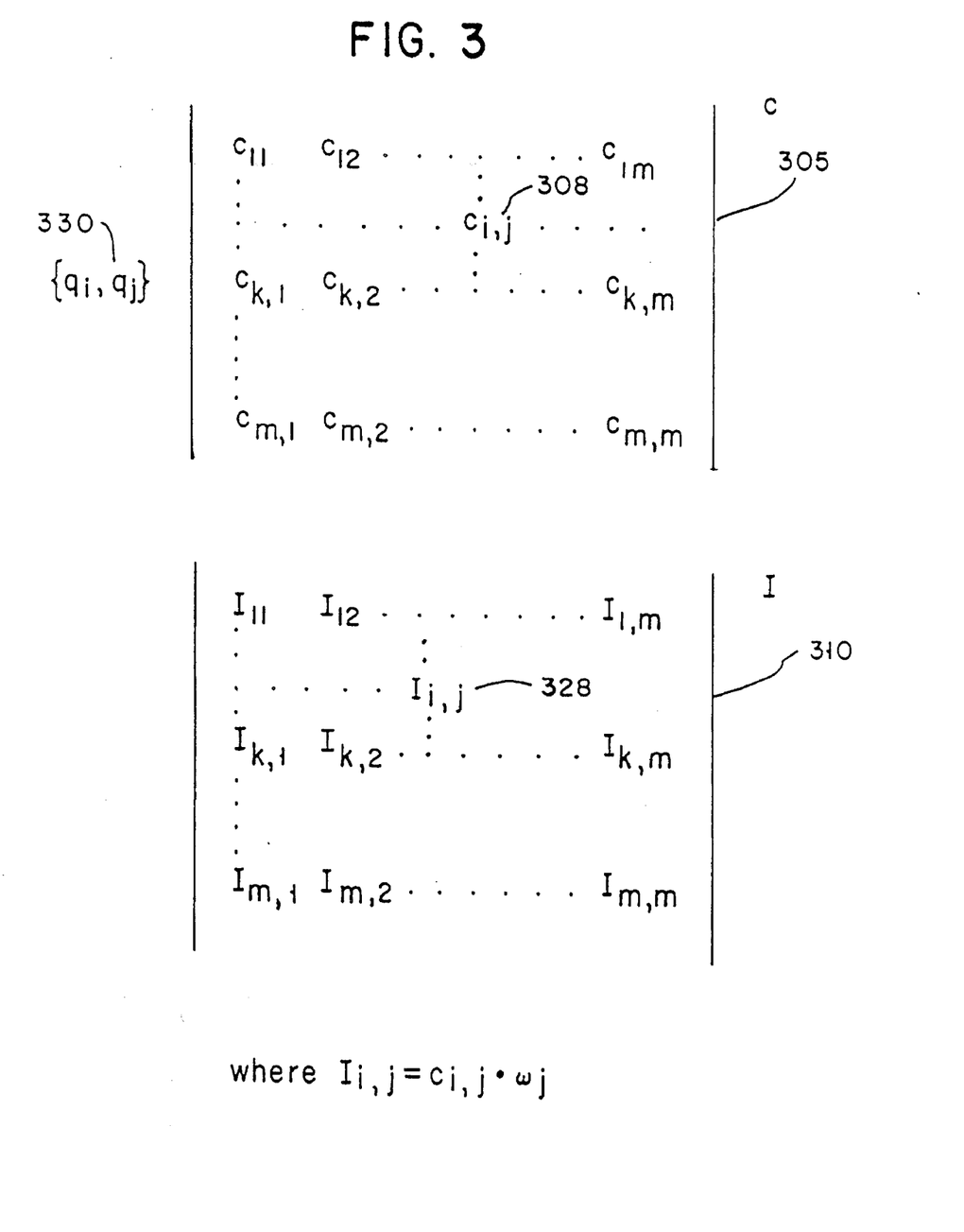
FIG. 3 shows data structures used in one preferred intersection step of the present method.

FIG. 3 shows data structures that can be used by one-method to implement the intersection 230 in this preferred embodiment. Matrices "C" 305 and "I" 310 are m X m matrices where m is the number of queries in the query set, Q. The elements, $c_{i,j}$, typically 308, of matrix C 305 have a value that indicates if there are common objects between the queries in a given query pair, typically 330. The query pair 330 contains an intersected query $q_i$ (in row i) and intersecting query $q_j$ (in column j), respectively. If the query pair 330 has common objects, the value of the matrix 305 element, $c_{i,j}$ 308; representing the query pair $q_i$ and $q_j$, will have the value of "1". If the query pair has no common objects, the value of the matrix 305 element 308 will be zero. Once the query pairs with common elements have been identified in this manner, a pair intersection weight, $I_{i,j}$, typically 328 is calculated for each query pair, 330. The value of the pair intersection weight 328 of the pair is the weight, $w_j$, of the intersecting query, (here the query represented by the column of the matrix), $q_j$, if the query pair 330 has common objects and zero otherwise. One way to determine the values for all of the pair intersection weights 328 in matrix I 310 is to examine the value of the element 308 corresponding to the query pair 330 in matrix 305 and to insert a value of $I_{i,j}$ 328 equal to the intersecting query weight, $w_j$, if the element 308 is "1" or inserting a value of zero if the element 308 is zero. Alternatively, the pair intersection weights 328 in matrix I 310 can be calculated by:

$$I_{i,j} = c_{i,j} w_j.$$

Given this disclosure, one skilled in the art could develop alternative methods for performing the intersection 230 of the query pairs 330 in the query set, Q. For instance, the intersection value of query pairs 330 with common objects could be a function (product or sum) or the weights of the queries of the pair. These alternative embodiments are within the contemplation of the invention.

In the next step of the present method 200, a ranking is assigned 240 to each query of the query set, Q. The query ranking can be performed in a number of ways.

For example, the queries can be ranked according to their weight, $w_i$. In this embodiment, the rank of a query $q_i$, $rank_i$, is proportional to the weight of the query, $w_i$, i.e., the greater the query weight, the higher the rank given the query.

In an alternative embodiment, the rank of a query i is inversely proportional to the amount of space that the objects that the given query $q_i$ accesses. This embodiment ranks queries that have objects requiring less storage space higher than queries that have objects requiring more steerage space. This ranking tends pack more objects that are accessed by the same queries together. The criteria for this embodiment can be stated as follows:

$$rank_i = (1/minPages_i)$$

where $minPages_i$ is the minimum storage space required by the subset of objects, $O_i$, accessed by intersected query, $q_i$.

In still another embodiment, the rank, $rank_i$, for each intersected query, $q_i$, can be inversely related to the sum of the pair intersection weights 328, $I_{i,j}$, for that intersected query. Specifically, $$rank_i = 1/(1+\Sigma I_{i,j})$$

where i is constant for a given intersected query, $q_i$, j varies from 1 to m over all the intersecting queries, $q_j$ and $\Sigma I_{i,k}$ is the sum of the pair intersection weights 328 associated with a given intersected query, $q_i$. In FIG. 3 this would represent the sum of the pair intersection weights 328 in the row of I matrix 310 that corresponds to a given intersected query (row), $q_i$. (The value 1 is added to the denominator to avoid division by zero.) In this embodiment, queries that access objects that are accessed in common with a large number of other queries in the set of queries, Q, are given a lower ranking than queries that access objects that are accessed in common with a Fewer number of queries. This method of ranking tends to pack objects together that are accessed by a select subset of queries. Ranking (and packing, see below) in this manner also tends to reduce the number of page faults. Note that in this ranking method, only the non-zero pair intersection weights 328, $I_{i,j}$, effect the outcome of the ranking.

Other preferred embodiments use two or more of the above described ranking methods 240 together. In a most preferred embodiment, all three ranking criteria are used. Specifically, $$rank_i = (w_i/minPages_i)/(1+\Sigma I_{i,j})$$

This ranking method tends to give a higher rank to the queries that have: 1. a higher weight, 2. a subset of accessed objects, $O_i$, that requires less memory storage, and 3. a set of accessed objects, $O_i$, that tend not to be in common with objects accessed by other queries. The ranking step 240 is performed for each intersected query, $q_i$, until each query in the set of queries, Q, is given a rank.

In the next step of the present method 200, the objects belonging to each query, $q_i$, are assigned 250 to a page of memory 145 according to the rank order of the queries that access the object. This step is also referred to as "packing" 250.

Figure 4A:
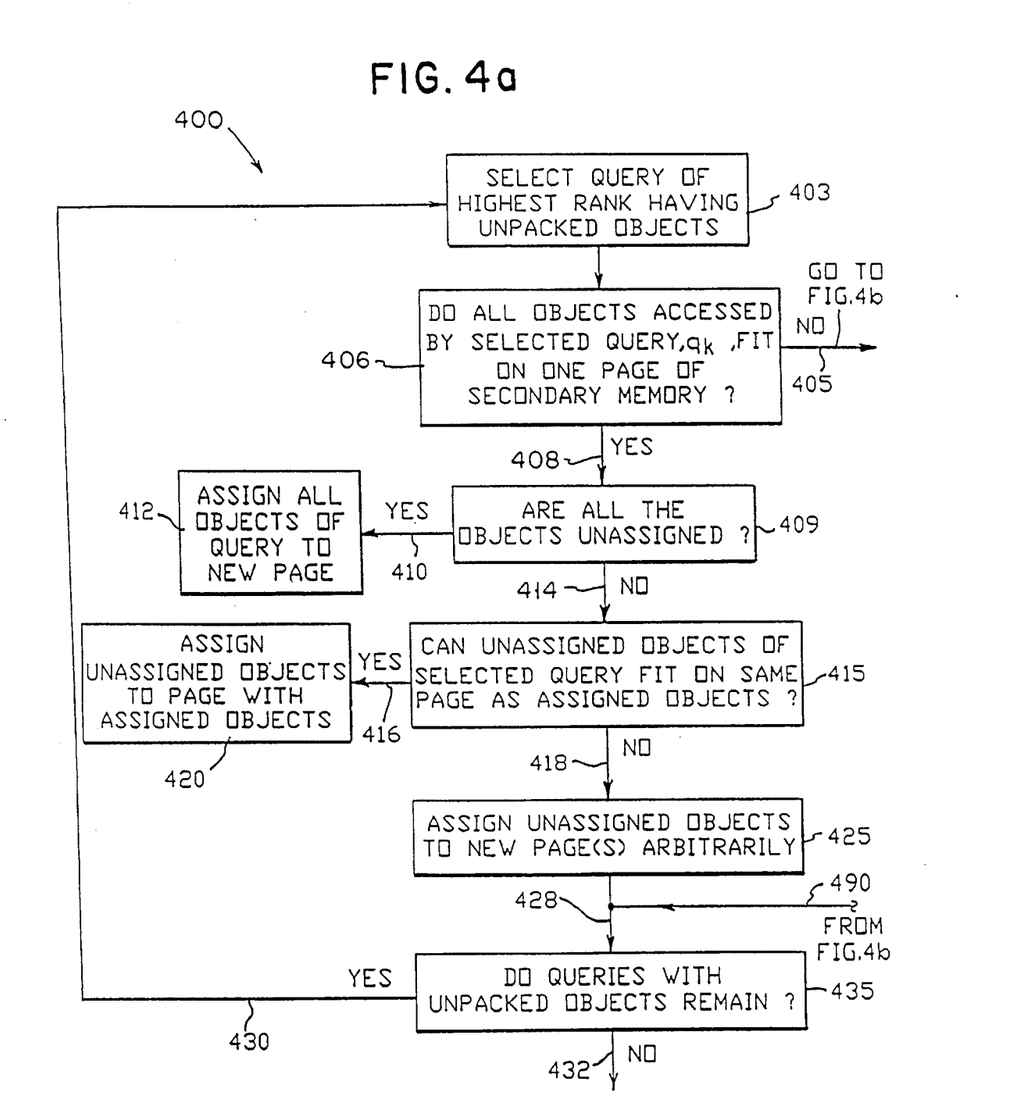
FIGS. 4a and 4b are flow charts showing the steps of assigning objects of queries in a query set to pages of secondary memory.
Figure 4B:
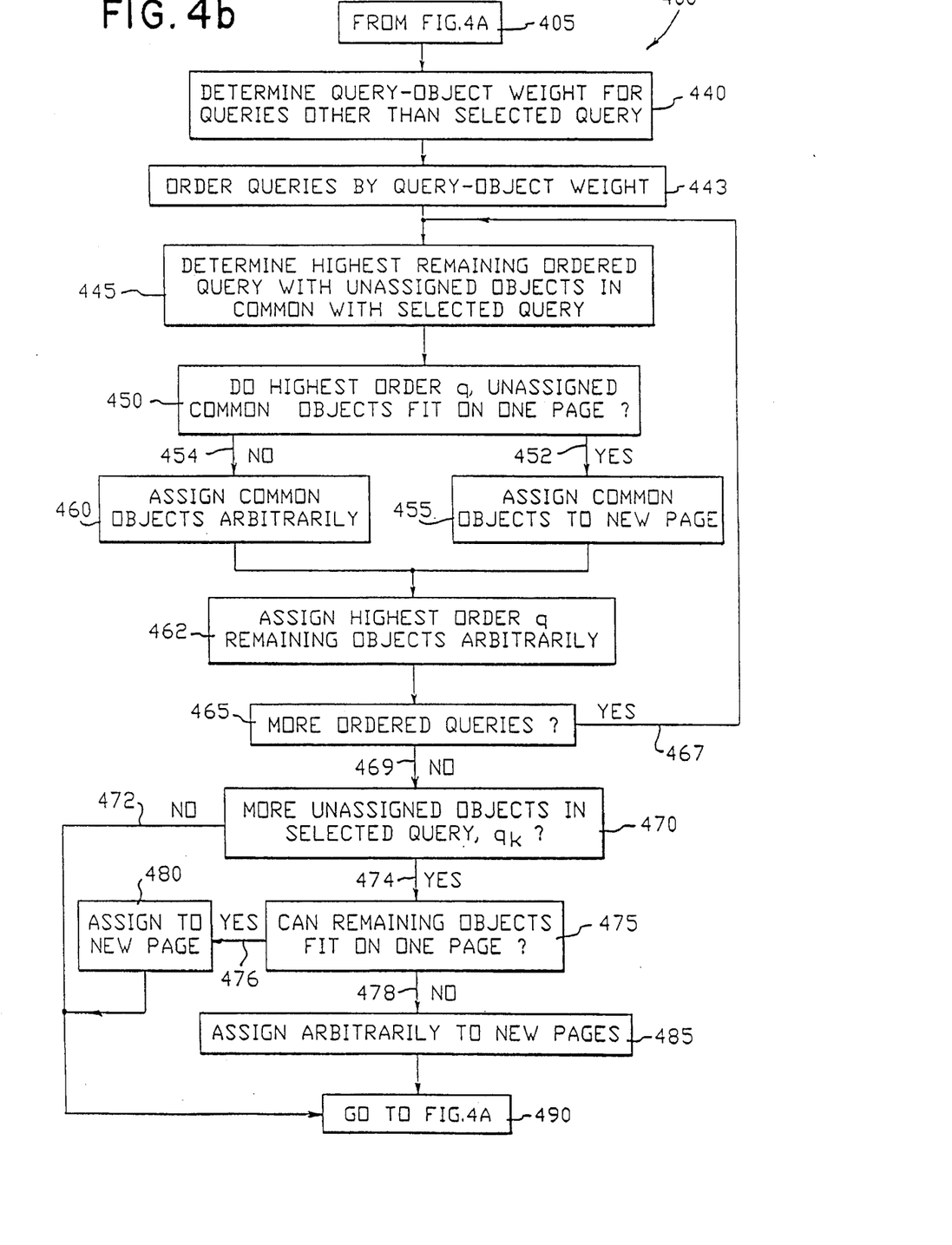

FIGS. 4a and 4b show one preferred method 400 of performing the the packing step 250. The packing step 250 begins by selecting 403 the query with unpacked objects that has the highest rank. The query ranking was determined in step 240 as described above. This query is called the selected query, $q_k$. The subset of objects, $O_k$, accessed by the selected query, $q_k$, are then examined 406 to determine whether all those objects, $O_k$, will fit on one page of secondary memory 145. If the objects will not fit on one page 405, they are packed with the method steps shown in FIG. 4b. However, if the objects, $O_k$, can fit on one page 408 and all the objects are unassigned 410 (as determined in step 409), all the objects accesses by the selected query, $q_k$, are assigned to a new page 412 of secondary memory 145. Alternatively, if some of the objects, $O_k$, accessed by selected query, $q_k$, are assigned 414 to a page of secondary memory 145, the unassigned objects of $O_k$, are examined 415 to determine if they can fit on the same page of memory 145 as the assigned objects of $O_k$. If they can 416, the unassigned objects are assigned 420 to the same secondary memory page 145 containing the assigned objects. If they can not 418, the unassigned objects of the selected query, $q_k$, are arbitrarily assigned 425 to new pages 145 of secondary memory. At this point 428, all the objects, $O_k$, of the selected query, $q_k$, are assigned to one or more pages 145 of secondary memory. The remaining queries are then examined to determine if they contain any unassigned objects 435. If there are remaining queries with unassigned objects 430, the process is repeated starting with step 403 with a new selected query of highest rank. IF there are not 432, the process may end or go on to combine partially filled pages 145. (See the description of FIG. 5 below.) Note that queries of lower rank that only have objects that are in common with queries of higher rank will have all of the objects that they access assigned to secondary memory pages before they become a selected query.

FIG. 4b shows the steps performed to assign objects $O_k$, accessed by a selected query, $q_k$, to multiple memory pages 145 when all of these objects do not fit 405 on one page 145 of secondary memory.

This part of the object assignment begins by determining a "query-object" weight 440 for all the queries in the query set, Q, other than the selected query, $q_k$. To calculate the query-object weight, the number of objects that each query has in common with the selected query, $q_k$, is multiplied by the respective weight of the query. This calculation creates a set of m-1 query-object weights (none is calculated for the selected query) each associated with its respective query in a set of query-object weights relative to each of the m-1 queries.

The queries are then ordered according to their respective query-object weight 443 in the query-object weight set. This ordered set is then examined to determine which query with unassigned objects in common with the selected query, $q_k$, has the highest query-object weight in the set 445. The objects of this query with the highest query-object weight are then examined to determine if they can be fit on one page 145 of secondary memory 450. If they can 452 all the objects of the highest ordered query that are in common with the selected query, $q_k$, are assigned 455 to a new page 145 of secondary memory. If they can not all be assigned to a common page 454, all the objects of the highest ordered query that are in common with the selected query are arbitrarily assigned 460 to a minimal number of new page(s) 145 of secondary memory required to store the objects. Once all of the objects in common with the selected query and the highest order query are assigned, the remaining unassigned objects of the highest order query (those remaining that are not in common with the selected query) are assigned 462 arbitrarily to new pages 145 of secondary memory. At this point 465, the highest ordered query is removed from the query-object weight set (ordered set) and it is determined whether there are any other queries in the ordered set with unassigned objects 465. If there are 467, the process is repeated starting with box 445 until the ordered set is empty. At this point 469, all the objects in common with the selected query, $q_k$, and all the other queries in the query set, Q, are assigned to pages 145 of secondary memory. However, there may still be unassigned objects that are accesses by the selected query, $q_k$. This is determined in box 470. If the selected query has no unassigned objects 472 the next step 490 is box 435 on FIG. 4a. (See description above.) If there are remaining unassigned objects in the selected query 474 and if those objects can fit on one page 476 as determined in step 475, all the remaining unassigned objects accessed by the selected query, $q_k$, are assigned 480 to a new page 145 of secondary memory. If, as determined in step 475, the remaining unassigned objects of the selected query can not be assigned 478 to one page, the remaining unassigned objects accessed by the selected query are arbitrarily assigned 485 to new page(s) 145 of secondary memory. After either step 480 or 485, all the objects accessed by the selected query, $q_k$, have been assigned and step 435 on FIG. 4a is performed.

Figure 5:
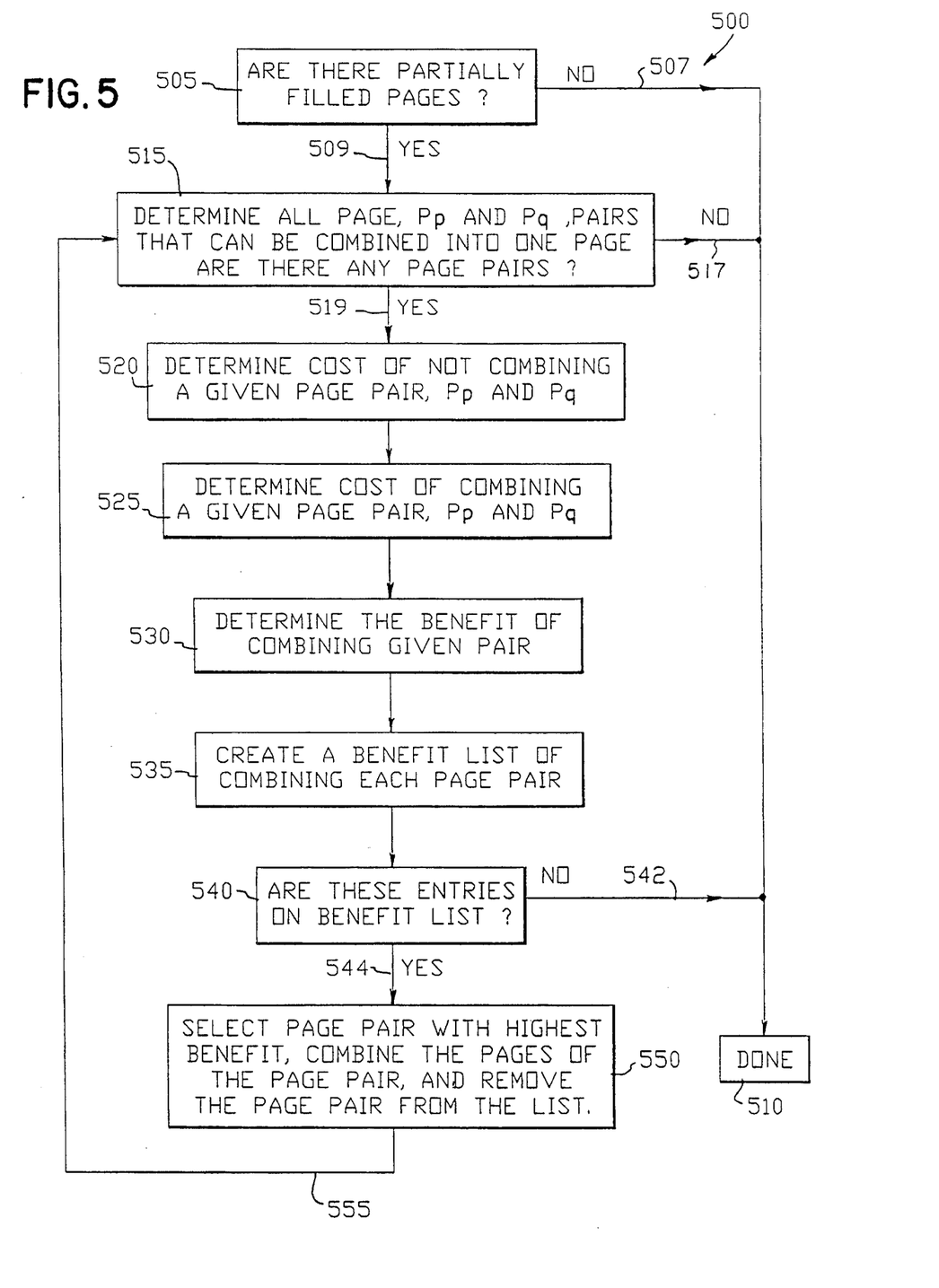
FIG. 5 is a flow chart showing the steps of combining pages of secondary memory that are partially filled with query accessed objects so that the number of pages accessed by the query set is reduced.

FIG. 5 is a flow chart showing the steps of combining partially filled pages of objects to further reduce the number of pages 145 the system 100 is required to transfer 135 when the query set, Q, accesses the objects stored in secondary memory 140. Generally, the system can access stored objects faster if the number of pages 145 on which the objects are stored is reduced. These steps 500 that combine partially filled pages may be performed after step 435 of FIG. 4a.

The method of combining partially filled pages begins 505 by determining whether there are any pages 145 only partially packed with objects. If not 507, the method ends 510. If there are 509, all pairs of pages that can be combined into one page are determined 515. This can be done by summing the amount of storage space used in each page of the page pair and determining if this amount of storage is less than a full page of storage. (The pages in a given page pair will be typically designated as $P_p$ and $P_q$.) If there are no page pairs that can be combined 517, the process ends 510. However, if there are page pairs that can be combined 519, the page pairs are combined to minimize cost, i.e., maximize benefit.

The cost of a query set, Q, is defined as the product of the weight of each query, $w_i$, and the number of pages that store objects (the subset $O_i$) for that respective query, summed for all queries, $q_i$, in the query set. The benefit of combining two pages, $P_p$ and $P_q$, is the difference between the cost of the query set with the pages not combined and the cost of the query set with the pages are combined. Specifically, $$\text{Query Set Cost} = \Sigma w_i \, \text{Page}_i$$

where $w_i$ is the weight of a query, $q_i$, $\text{Page}_i$ is the number of pages storing objects accessed by $q_i$, and i varies from 1 to m over all the queries in the query set, Q.

The $\text{benefit}_{p,q}$ is defined as $$\text{benefit}_{p,q} = \text{Cost}_{p,q} - \text{Cost}_{pq}$$

where $\text{Cost}_{p,q}$ is the cost of the query set, Q, with the page pair $\text{Page}_p$, and $\text{Page}_q$ not combined and $\text{Cost}_{pq}$ is the cost of the query set, Q, with the same page pair is combined.

To determine whether or not to combine pages of a page pair, the cost of the query set, Q, is determined with the pages in the page pair not combined 520. Then the cost of the query set, Q, is determined with the pages of the page pair combined 525. The benefit of combining the given page pair is then determined 530 as described above. After the benefits have been determined for all the page pairs that can be combined, a benefit list is created 535 with the page pairs being sorted by their respective benefit. If there are not 542 any page pairs represented on the benefits list, as determined in box 540, the method ends 510. However, if there are 544 page pairs represented on the benefits list, the page pair with the highest benefit is selected 550. The pages in this page pair are then combined and the representation of this page pair is removed from the benefits list 550. At this point, the method is repeated starting at box 515 until there is no more benefit attained by combining page pairs 542.

Typically, packing objects of a query set in the manner described in this disclosure and combining the partial filled memory pages to minimize the query set cost reduces the time needed to perform the query set access of the secondary memory. Further, the present method can be repeated periodically or at specific times (when adding a new application program 132) in order to serve as a dynamic method for clustering (packing) objects on secondary storage.

Given this novel disclosure, one skilled in the art could develop equivalent alternative methods For performing the present invention. These equivalent methods are also within the contemplation of the inventors.

We claim:

1. A method of clustering, on one or more pages of secondary memory of a computer, an object set of a plurality of objects accessed by a query set of a plurality of queries, comprising the steps of:

identifying each query in the query set and a subset of objects that each query accesses from the secondary memory;

identifying the objects in the object set as being all of the objects contained by all the subsets of objects accessed by all of the queries in the query set;

ranking each of the queries in the query set according to a query weight, the query weight being determined by a product of a number of times one application program runs on the computer with a number of times the query occurs in the application program, the product summed over a plurality of application programs capable of running on the computer;

selecting a selected query from the query set according to the rank of the selected query; and packing the objects in a selected subset of objects on a page of one or more secondary memory pages if all of the objects in the selected subset of objects fit on the page, the selected subset of object being the subset of objects that the selected query accesses.

2. A method of clustering objects, as in claim 1, where the queries in the query set are ranked also by a space requirement for the subset of objects accessed by the query, with objects taking less space tending to be clustered before objects taking more space.

3. A method of clustering objects, as in claim 1, where the queries in the query set are ranked also by the number of objects that a query has in common with other queries in the query set, with objects being accessed by a fewer number of queries being cluster before objects being accessed by a greater number of queries.

4. A method of clustering objects, as in claim 1, where the queries in the query set are ranked also by a secondary memory page storage space requirement for the objects accessed by a query, and the number of queries that access a common object.

5. A method of clustering objects, as in claim 1, comprising the additional step of combining a pair of secondary memory pages that are partially filled with objects in order to reduce a query set cost of accessing the objects stored in the secondary memory.

6. A method of clustering objects, as in claim 5, where the step of combining a pair of partially filled pages is repeated until the query set cost can no longer be reduced.

7. A method of clustering objects, as in claim 1, where the the queries in the query set are ranked also by an intersection weight, the intersection weight for an intersected query being the sum of one or more pair intersection weights of the intersected query, each pair intersection weight being the query weight of one of the queries that has objects in common with the intersected query, the intersected query being one of the queries in the query set.

8. A computer apparatus with an object set of a plurality of objects stored on one or more pages of a secondary memory and a query set for querying the stored objects through a user interface, the objects being packed on the pages of memory according to the following method:

identifying each query in the query set and a subset of objects that each query accesses from the secondary memory;

identifying the objects in the object set as being all of the objects contained by all the subsets of objects accessed by all of the queries in the set;

ranking each of the queries in the query set according to a query weight, the query weight being determined by a product of a number of times one application program runs on the computer with a number of times the query occurs in the application program, the product summed over a plurality of application programs capable of running on the computer;

selecting a selected query from the query set according to the rank of the selected query; and packing the objects in a selected subset of objects on a page of one or more secondary memory pages if all of the objects in the selected subset of objects fit on the page, the selected subset of object being the subset of objects that the selected query accesses.

* * * * *